(12) United States Patent
Bassett

(10) Patent No.: US 9,307,690 B2
(45) Date of Patent: Apr. 12, 2016

(54) FORGED TOOTHED WHEEL FOR A ROW CROP PLANTER

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 200 days.

(21) Appl. No.: 14/052,533

(22) Filed: Oct. 11, 2013

(65) Prior Publication Data

US 2014/0033958 A1 Feb. 6, 2014

Related U.S. Application Data

(63) Continuation-in-part of application No. 13/523,557, filed on Jun. 14, 2012, now abandoned.

(51) Int. Cl.
*A01C 7/00* (2006.01)
*A01C 5/06* (2006.01)
*A01B 35/16* (2006.01)

(52) U.S. Cl.
CPC .............. *A01C 5/066* (2013.01); *A01B 35/16* (2013.01); *A01C 7/006* (2013.01)

(58) Field of Classification Search
USPC ............. D15/28, 29; 111/139–143, 190–193; 172/540, 548, 551, 555, 556
See application file for complete search history.

(56) References Cited

U.S. PATENT DOCUMENTS

| | | | |
|---|---|---|---|
| 114,002 A | 4/1871 | Godfrey | |
| 321,906 A * | 7/1885 | McCormick | 172/183 |
| 353,491 A | 2/1886 | Wells | |
| 523,508 A | 7/1894 | Bauer et al. | |
| 736,369 A | 8/1903 | Dynes et al. | |
| 803,088 A | 10/1905 | Barker | |
| 1,844,255 A * | 2/1932 | Kaupke | 172/548 |
| 2,014,334 A | 9/1935 | Johnson | |
| 2,269,051 A | 1/1942 | Cahoy | |
| 2,341,143 A | 2/1944 | Herr | |
| 2,596,527 A * | 5/1952 | Bushong | 172/555 |
| 2,664,040 A * | 12/1953 | Beard | 172/548 |
| 2,773,343 A | 12/1956 | Oppel | |
| D221,461 S * | 8/1971 | Hagenstad | D15/29 |
| 3,650,334 A * | 3/1972 | Hagenstad | 172/540 |
| 3,766,988 A | 10/1973 | Whitesides | 172/548 |
| 4,187,916 A | 2/1980 | Harden et al. | 172/146 |
| 4,194,575 A * | 3/1980 | Whalen | 172/551 |
| 4,241,674 A | 12/1980 | Mellinger | 111/52 |
| 4,391,335 A * | 7/1983 | Birkenbach | 172/540 |
| 4,398,608 A * | 8/1983 | Boetto | 172/551 |

(Continued)

*Primary Examiner* — Alicia Torres
(74) *Attorney, Agent, or Firm* — Nixon Peabody LLP

(57) ABSTRACT

A forged agricultural wheel with a radial grain pattern includes a plurality of teeth projecting radially outwardly from a hub, with each tooth having a tooth root adjacent to the internal periphery of the hub. Each tooth further has a leading soil-contacting surface extending from the tooth root in a curved counterclockwise manner and having a variable width with a maximum tooth width. A trailing surface opposite the leading soil-contacting surface extends from the tooth root in a curved counterclockwise manner. A tooth end is angled counterclockwise away from a radius passing from a central axis through a central point of the tooth root. The tooth end connects the two surfaces and converges to a point on a maximum outside diameter of the wheel. An adjoining root valley connects each pair of adjacent teeth and has a thickness that is substantially thinner than the maximum tooth width.

12 Claims, 14 Drawing Sheets

(56) References Cited

U.S. PATENT DOCUMENTS

| | | | | |
|---|---|---|---|---|
| 4,646,850 A | * | 3/1987 | Brown et al. | 172/551 |
| 5,129,282 A | | 7/1992 | Bassett et al. | 74/529 |
| 5,190,112 A | | 3/1993 | Johnston et al. | 172/245 |
| 5,224,553 A | * | 7/1993 | Heintzman | 172/556 |
| 5,337,832 A | | 8/1994 | Bassett | 172/504 |
| 5,346,020 A | | 9/1994 | Bassett | 172/540 |
| 5,419,402 A | | 5/1995 | Heintzman | 172/551 |
| 5,443,023 A | | 8/1995 | Carroll | 111/191 |
| 5,461,995 A | | 10/1995 | Winterton | 111/139 |
| 5,477,792 A | | 12/1995 | Bassett et al. | 111/121 |
| 5,479,868 A | | 1/1996 | Bassett | 111/139 |
| 5,497,837 A | | 3/1996 | Kehrney | 172/619 |
| 5,499,683 A | | 3/1996 | Bassett | 172/4 |
| 5,542,362 A | | 8/1996 | Bassett | 111/120 |
| 5,640,914 A | | 6/1997 | Rawson | 111/140 |
| 5,685,245 A | | 11/1997 | Bassett | 111/62 |
| 5,704,430 A | | 1/1998 | Smith et al. | 172/29 |
| 5,709,271 A | | 1/1998 | Bassett | 172/4 |
| 5,852,982 A | | 12/1998 | Peter | 111/118 |
| 5,970,891 A | | 10/1999 | Schlagel | 111/135 |
| 6,067,918 A | | 5/2000 | Kirby | 111/121 |
| 6,389,999 B1 | | 5/2002 | Duello | 111/200 |
| 6,575,104 B2 | | 6/2003 | Brummelhuis | 111/139 |
| 6,644,224 B1 | | 11/2003 | Bassett | 111/157 |
| 6,701,856 B1 | | 3/2004 | Zoke et al. | 111/121 |
| 6,912,963 B2 | | 7/2005 | Bassett | 111/163 |
| 7,222,575 B2 | | 5/2007 | Bassett | 111/140 |
| 7,451,712 B2 | | 11/2008 | Bassett et al. | 111/140 |
| 7,575,066 B2 | | 8/2009 | Bauer | 172/540 |
| 7,665,539 B2 | | 2/2010 | Bassett et al. | 172/540 |
| 7,673,570 B1 | | 3/2010 | Bassett | 111/63 |
| 7,743,718 B2 | | 6/2010 | Bassett | 111/135 |
| 8,146,519 B2 | | 4/2012 | Bassett | 111/119 |
| 8,151,717 B2 | | 4/2012 | Bassett | 111/135 |
| D663,326 S | * | 7/2012 | Allensworth et al. | D15/29 |
| 8,327,780 B2 | | 12/2012 | Bassett | 111/119 |
| 8,393,407 B2 | | 3/2013 | Freed | 172/551 |
| 8,408,149 B2 | | 4/2013 | Rylander | 111/140 |
| 8,544,397 B2 | | 10/2013 | Bassett | 111/167 |
| 8,544,398 B2 | | 10/2013 | Bassett | 111/167 |
| 8,636,077 B2 | | 1/2014 | Bassett | 172/195 |
| 2002/0162492 A1 | | 11/2002 | Juptner | 111/140 |
| 2007/0044694 A1 | | 3/2007 | Martin | 111/121 |
| 2010/0198529 A1 | | 8/2010 | Sauder et al. | 702/41 |
| 2011/0247537 A1 | | 10/2011 | Freed | 111/140 |
| 2012/0210920 A1 | | 8/2012 | Bassett | 111/140 |
| 2012/0305274 A1 | | 12/2012 | Bassett | 172/5 |
| 2013/0032363 A1 | | 2/2013 | Curry et al. | 172/4 |
| 2013/0133904 A1 | | 5/2013 | Bassett | 172/239 |
| 2013/0146318 A1 | | 6/2013 | Bassett | 172/5 |
| 2013/0192186 A1 | | 8/2013 | Bassett | 56/10.2 E |
| 2013/0199808 A1 | | 8/2013 | Bassett | 172/260.5 |
| 2013/0213676 A1 | | 8/2013 | Bassett | 172/260.5 |
| 2013/0248212 A1 | | 9/2013 | Bassett | 172/4 |
| 2013/0264078 A1 | | 10/2013 | Bassett | 172/260.5 |
| 2013/0306337 A1 | | 11/2013 | Bassett | 172/260.5 |
| 2014/0026748 A1 | | 1/2014 | Stoller et al. | 91/418 |
| 2014/0034339 A1 | | 2/2014 | Sauder et al. | 172/2 |
| 2014/0034344 A1 | | 2/2014 | Bassett | 172/5 |
| 2014/0048001 A1 | | 2/2014 | Bassett | 111/59 |
| 2014/0048295 A1 | | 2/2014 | Bassett | 172/2 |
| 2014/0048296 A1 | | 2/2014 | Bassett | 172/4 |
| 2014/0048297 A1 | | 2/2014 | Bassett | 172/4 |

* cited by examiner

FORGED TOOTHED WHEEL FOR A ROW CROP PLANTER

CROSS-REFERENCE TO RELATED APPLICATIONS

This application is a continuation-in-part of U.S. patent application Ser. No. 13/523,557, filed on Jun. 14, 2012, for a "Row Crop Planter Having Closing Wheel With Modular Wheel Design," which is incorporated herein in its entirety.

FIELD OF THE INVENTION

The present invention relates generally to agricultural equipment and, more particularly, to a forged toothed wheel for no-till and conventional farming.

BACKGROUND OF THE INVENTION

In agricultural applications, farmers have typically used row crop planters with a single or double disk opener for opening a trench, roughly of a parabolic cross-section, in which seed is deposited. Traditionally, over many decades, a Vee-type closing wheel has been used in conventional tillage equipment for closing the trench. While most farmers still use conventional tillage equipment, various minimum-tillage systems and no-till systems have gained popularity over the past 20 years.

Based on the different tillage systems, and to achieve optimum results, the agricultural industry has recognized a need for using different closing wheel designs for various soil conditions. For example, a smooth semi-pneumatic rubber wheel has been used virtually since the onset of corn farming to the present day. With the advent of no-till farming, numerous other types of closing wheels have been marketed to address specific needs of planted seeds (e.g., corn seed), as well as non-optimal soil conditions.

One popular type of closing wheel is a toothed closed wheel, which has become a dominant type of closing wheel in both no-till and conventional farming. However, currently available toothed wheels present problems because each type of wheel is directed to limited planting applications and/or fails to function efficiently in different types of soil conditions. For example, certain toothed wheel designs tend to be optimized for a limited range of conditions and seed depths, lacking the capability for planting different types of crops. In another example, present toothed wheel designs accumulate mud buildup between teeth and, as such, rendering the toothed wheels inefficient or incapable of farming in muddy, wet soil conditions.

SUMMARY OF THE INVENTION

In accordance with one embodiment, a forged agricultural wheel has a radial grain pattern and includes a hub defining a central axis Z about which the wheel rotates in use. The hub has an outer edge defined by an internal periphery with a periphery diameter D2. The wheel further includes a plurality of teeth projecting radially outwardly from the hub to move soil into a furrow as the wheel rotates about its central axis. Each tooth of the plurality of teeth has a tooth root adjacent to the internal periphery of the hub, and a leading soil-contacting surface extending from the tooth root in a curved counterclockwise manner and having a variable width with a maximum tooth width W. A trailing surface is opposite the leading soil-contacting surface and extends from the tooth root in a curved counterclockwise manner. A tooth end is angled counterclockwise away from a radius passing from the central axis Z through a central point of the tooth root. The tooth end converges to a point and terminates on a maximum outside diameter D5 of the wheel. The tooth end connects the leading soil-contacting surface and the trailing surface. An adjoining root valley is located between each pair of adjacent teeth of the plurality of teeth, the root valley being along a tooth depth diameter D4 and having a thickness T that is substantially thinner than the maximum tooth width W.

In accordance with another embodiment, an agricultural row unit includes a towing frame for coupling to a tractor, an attachment frame rigidly connected to the towing frame, and a parallel-bar linkage coupled to the attachment frame. The agricultural row unit further includes a row unit frame having a forward end coupled to the linkage for permitting vertical pivoting movement of the row unit frame relative to the attachment frame, and a closing wheel assembly coupled to the row unit frame. The closing wheel assembly has a support arm, a hub assembly, and at least one toothed wheel forged with a radial grain pattern and having a plurality of teeth. Each tooth of the plurality of teeth has a tooth root adjacent to the internal periphery of the hub, a leading soil-contacting surface extending from the tooth root in a curved counterclockwise manner and having a maximum tooth width W, and a trailing surface opposite the leading soil-contacting surface and extending from the tooth root in a curved counterclockwise manner. A tooth end is angled counterclockwise away from a radius passing from the central axis Z through a central point of the tooth root. The tooth end converges to a point and terminates on a maximum outside diameter D5 of the wheel, the tooth end connecting the leading soil-contacting surface and the trailing surface.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
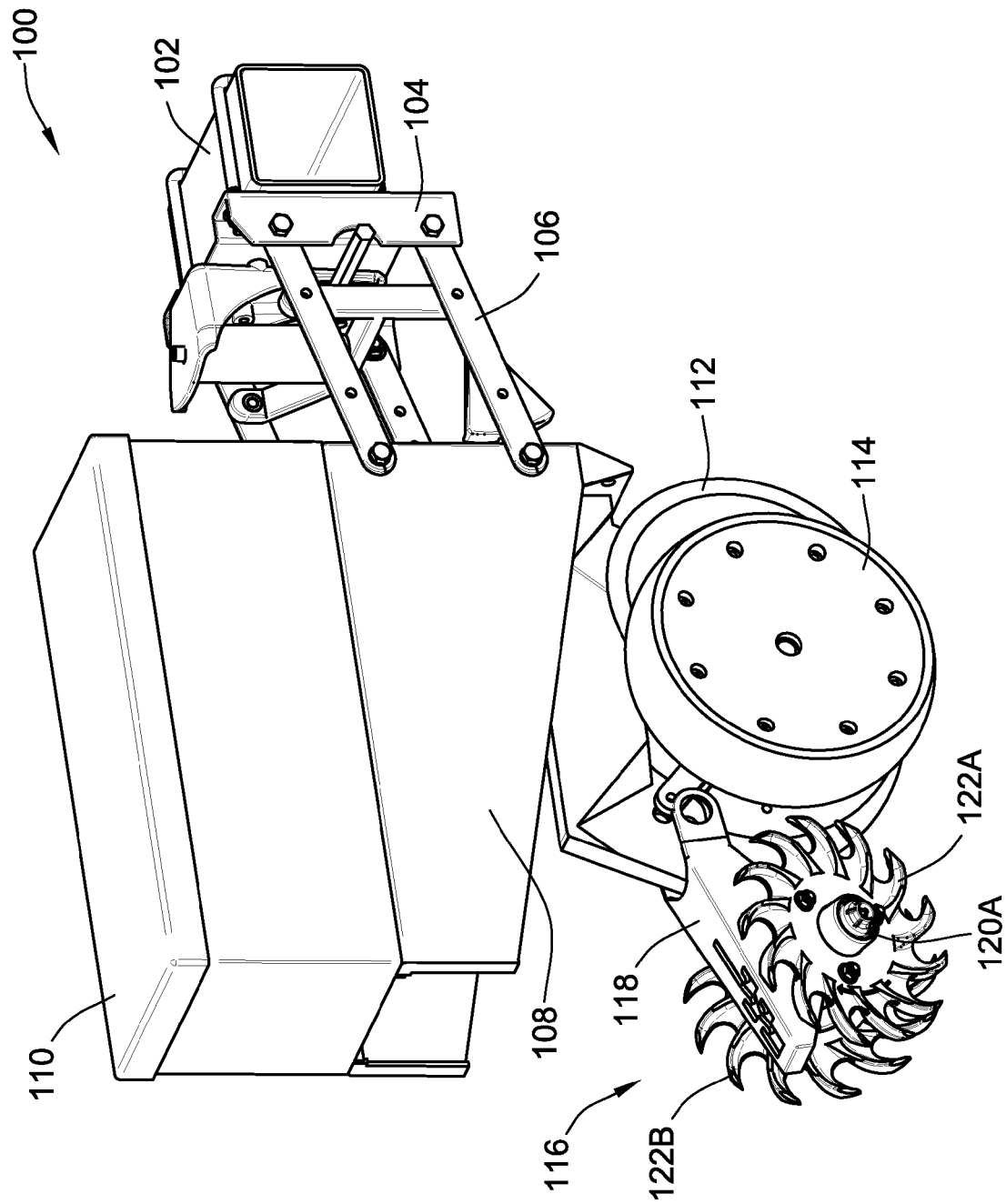
FIG. 1 is a perspective view of an agricultural row unit.

Turning now to the drawings and referring first to FIG. 1, an agricultural row unit 100 includes a towing frame 102 for being coupled to a tractor, and an attachment frame 104 that is rigidly connected to the towing frame 102. A parallel-bar linkage 106 is coupled to the attachment frame 104, and a row unit frame 108 has a forward end coupled to the linkage 106 for permitting vertical pivoting movement of the row unit frame 108 relative to the attachment frame 104. A planter bin 110 is mounted on the row unit frame 110 for carrying, for example, seeds, fertilizer, and/or chemicals that are dispensed during a planting operation.

A cutting wheel 112 is coupled to the row unit frame 108, in a forward position relative to a gauge wheel 114 and a closing-wheel assembly 116. The cutting wheel 112 is generally a coulter wheel that penetrates the soil to form a furrow or seed slot in preparation for the planting operation. However, other furrow-opening devices may be used, such as a V-opener that is formed by a pair of tilted coulter wheels that converge at their lower ends.

The gauge wheel 114 is coupled to the row unit frame 108, in a position located between the cutting wheel 112 and the closing-wheel assembly 116. The gauge wheel 114 determines the furrow depth, based on, for example, the desired planting depth for the seed and the height of introduction of fertilizer.

The closing-wheel assembly 116 has a support arm 118, a hub assembly 120A, and a pair of closing wheels 122A, 122B. The support arm 118 has a leading end that couples the hub assembly 120A to the row unit frame 108. The hub assembly 120A is mounted at a trailing end of the support arm 118 and includes a wheel-fastening mechanism (described below) with one or more removable fasteners. The closing wheels 122A, 122B close the furrow by distributing loosened soil into the furrow. The closing operation is generally performed after seed has been deposited in the furrow and fertilizer has been deposited adjacent to the furrow.

Figure 2C:
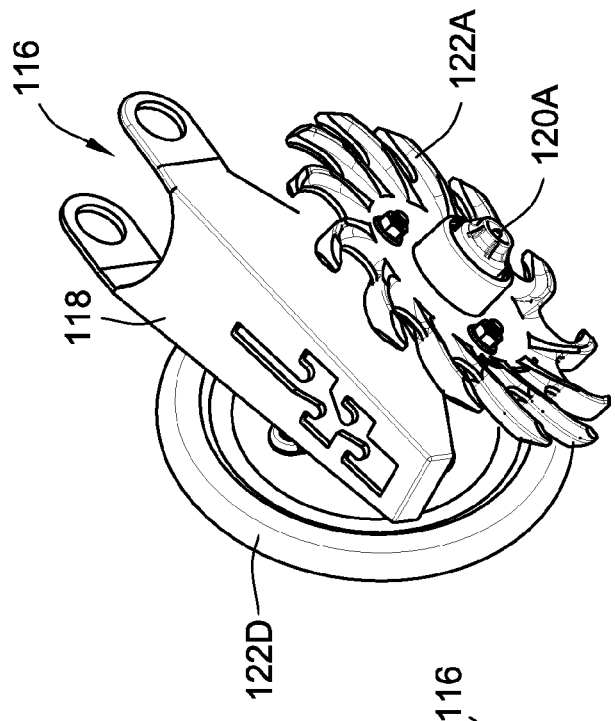
FIG. 2C is a left-perspective view of the modular closing-wheel assembly having a toothed wheel and a semi-pneumatic wheel.
Figure 2B:
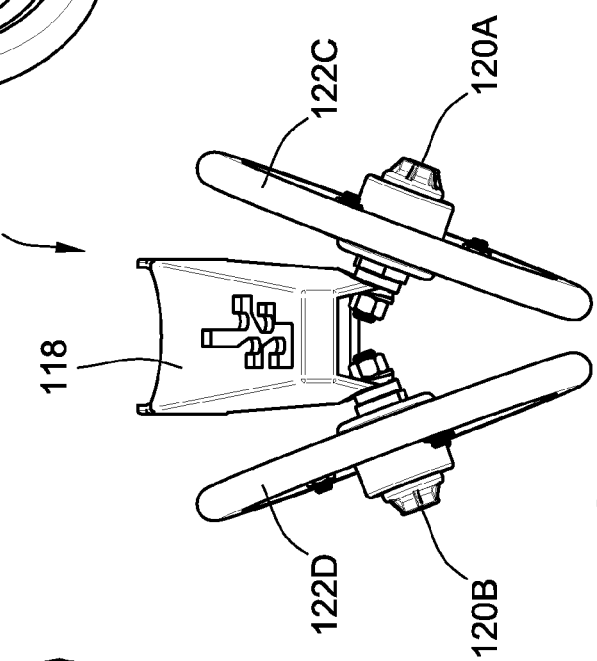
FIG. 2B is a front view of the modular closing-wheel assembly having two semi-pneumatic wheels.
Figure 2A:
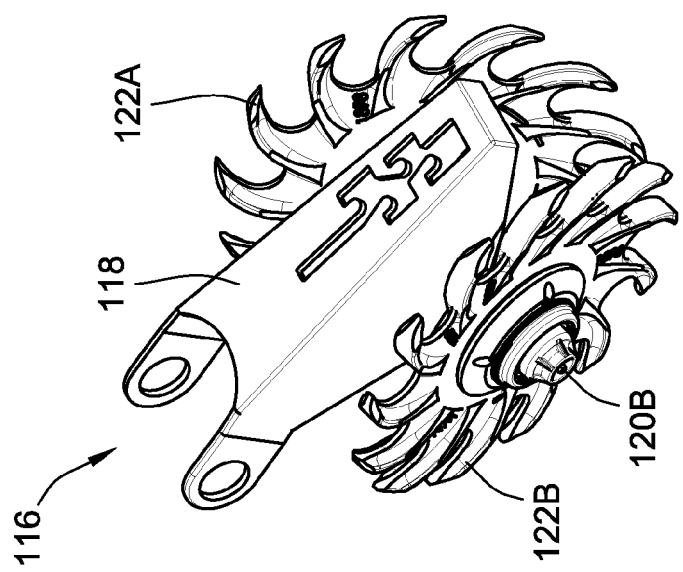
FIG. 2A is a right-perspective view of a modular closing-wheel assembly having two toothed wheels.

Referring to FIGS. 2A-2C, the closing-wheel assembly 116 is a modular assembly in which interchangeable closing wheels 122A-122D can be mounted. The closing wheels 122A-122D may be selected from a group of different types of wheels, including, e.g., a rubber semi-pneumatic wheel, a cast iron wheel, and a toothed wheel. The cast iron wheel may have a narrow smooth edge to produce high pressure. The toothed wheel may be a Dawn Curvetine™ closing wheel.

The closing-wheel assembly 116 has a right hub assembly 120A and a left hub assembly 120B. According to this embodiment, the right and left hub assemblies 120A, 120B are identical and symmetrically coupled to the support arm 118. However, in other embodiments, the right and left hub assemblies 120A, 120B can be different from each other and/or coupled in a non-symmetrical manner to the support arm 118. Alternatively, only one hub assembly can be used, with a respective closing wheel mounted thereto.

The closing wheels 122A-122D include a right closing wheel 122A in the form of a toothed wheel, a left closing wheel 122B also in the form of a toothed wheel, a right closing wheel 122C in the form of a semi-pneumatic wheel, and a left closing wheel 122D also in the form of a semi-pneumatic wheel. While in the illustrated embodiment the right and left toothed wheels 122A, 122B are identical to each other and the right and left semi-pneumatic wheels 122C, 122D are identical to each other, in alternative embodiments each of the closing wheels 122A-122D can be different from each other.

However, regardless of whether the closing wheels 122A-122D are different from each other, the closing-wheel assembly 116 is adapted to receive any of the closing wheels 122A-122D on any of the hub assemblies 120A. 120B, without any adaptation or modification to the closing-wheel assembly 116 except for exchanging one of the closing wheels 122A-122D for another one of the closing wheels 122A-122D (e.g., exchanging the right toothed wheel 122A with the right semi-pneumatic wheel 122C). For example, in FIG. 2A the closing-wheel assembly 116 includes two toothed wheels 122A, 122B, in FIG. 2B the closing-wheel assembly 116 includes two semi-pneumatic wheels 122C, 122D, and in FIG. 2C the closing-wheel assembly 116 includes one toothed wheel 122A and one semi-pneumatic wheel 122C. The exchange between one type of wheel, e.g., the right toothed wheel 122A, and another type of wheel, e.g., the right semi-pneumatic wheel 122C, is achieved using the same procedure and tools. In other words, no special tools or procedure is required for mounting one wheel than for mounting another wheel.

This type of modular interchangeability is extremely beneficial, for example, when varying soil conditions, type of crop, or varying tillage methods require quick and easy replacement of closing wheel. A farmer can change one type of closing wheel to another type of closing wheel, on the fly and without special additional tools or components. For example, the farmer may begin a planting operation with a first type of closing wheel that is best suited for dry soil conditions, which is less likely to adhere to the closing wheel. However, if weather conditions change during the planting operation such that soil "stickiness" is affected, e.g., rain changes dry soil into mud, the farmer will likely desire to change to a second type of closing wheel that is better suited for wet soil, which is more likely to adhere to the closing wheel.

Figure 3A:
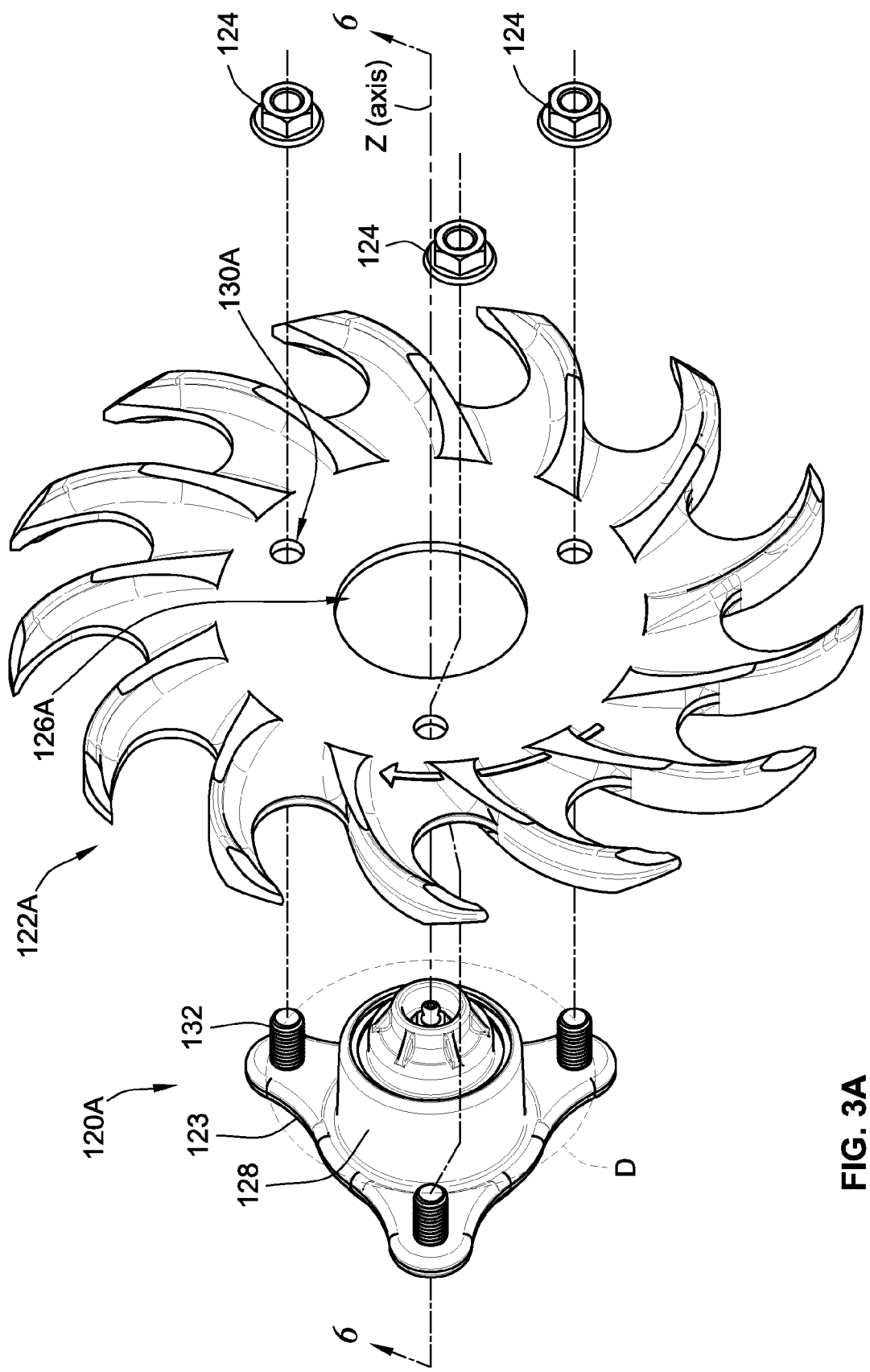
FIG. 3A is an exploded view of a closing-wheel assembly having a toothed wheel.
Figure 3B:
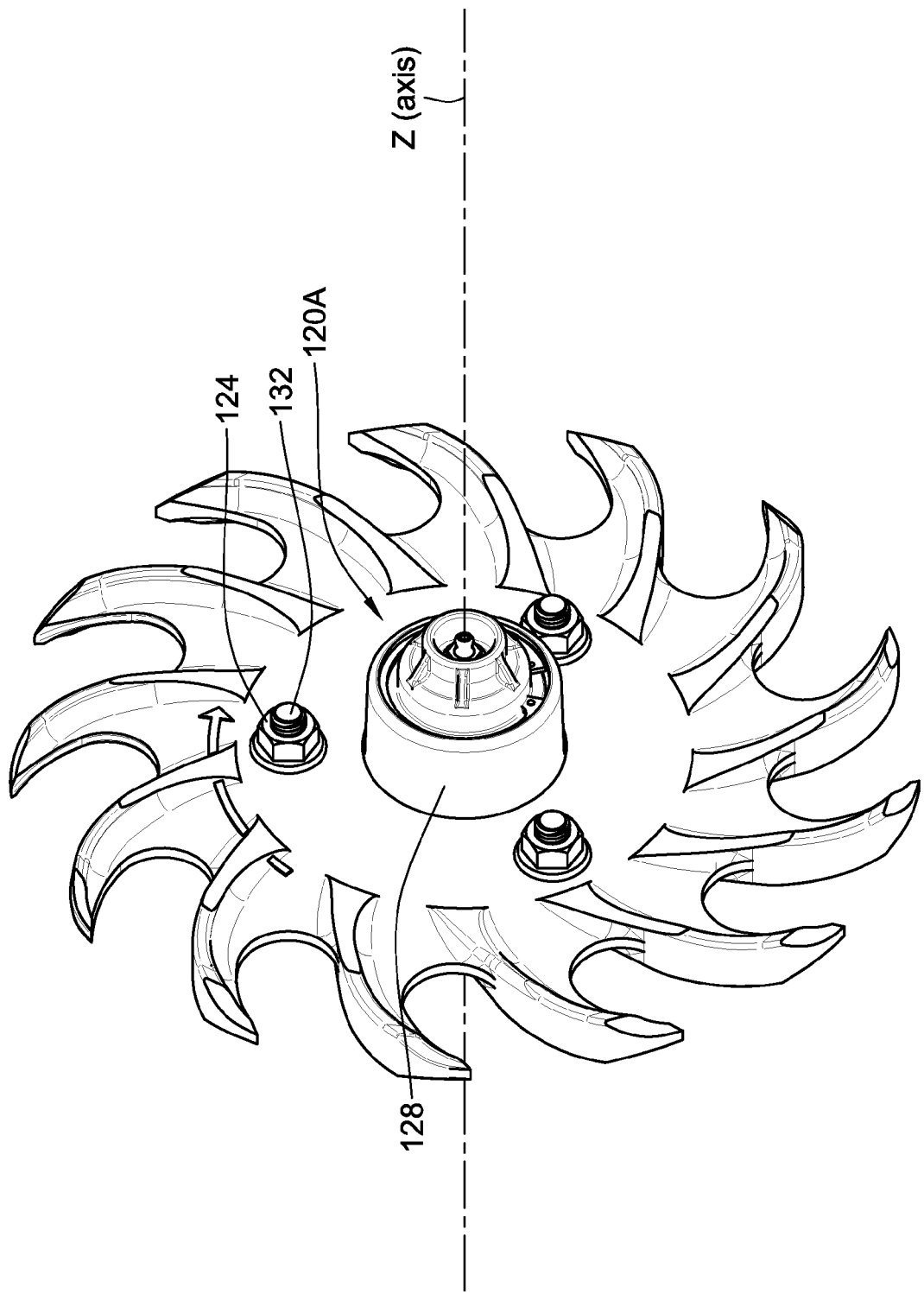
FIG. 3B is an assembled view of the closing-wheel assembly of FIG. 3A.

Referring to FIGS. 3A and 3B, the right toothed wheel 122A is mounted to a main hub 123 of the right hub assembly 120A via a wheel-fastening mechanism having a plurality of fastening nuts 124. To mount the right toothed wheel 122A to the right hub assembly 120A, a central hub hole 126A of the right toothed wheel 122A is inserted through a central receiving section 128 of the right hub assembly 120A. Simultaneously, three mounting holes 130A of the right toothed wheel 122A are inserted through respective ones of a plurality of threaded shafts 132 of the right hub assembly 120A.

The nuts 124 are fastened, respectively, to the threaded shafts 132 for retaining the right toothed wheel 122A securely in place relative to the right hub assembly 120A. As illustrated, the nuts 124 are arranged in a concentric arrangement around a rotational axis Z of the hub assembly 120A Optionally, the threaded shafts 13 are press-in studs that are inserted through a back surface of the main hub 123. The press-in studs are inserted and received through respective holes of a bolt circle D that is coaxial with the rotational axis Z of the hub assembly 120A.

Figure 4A:
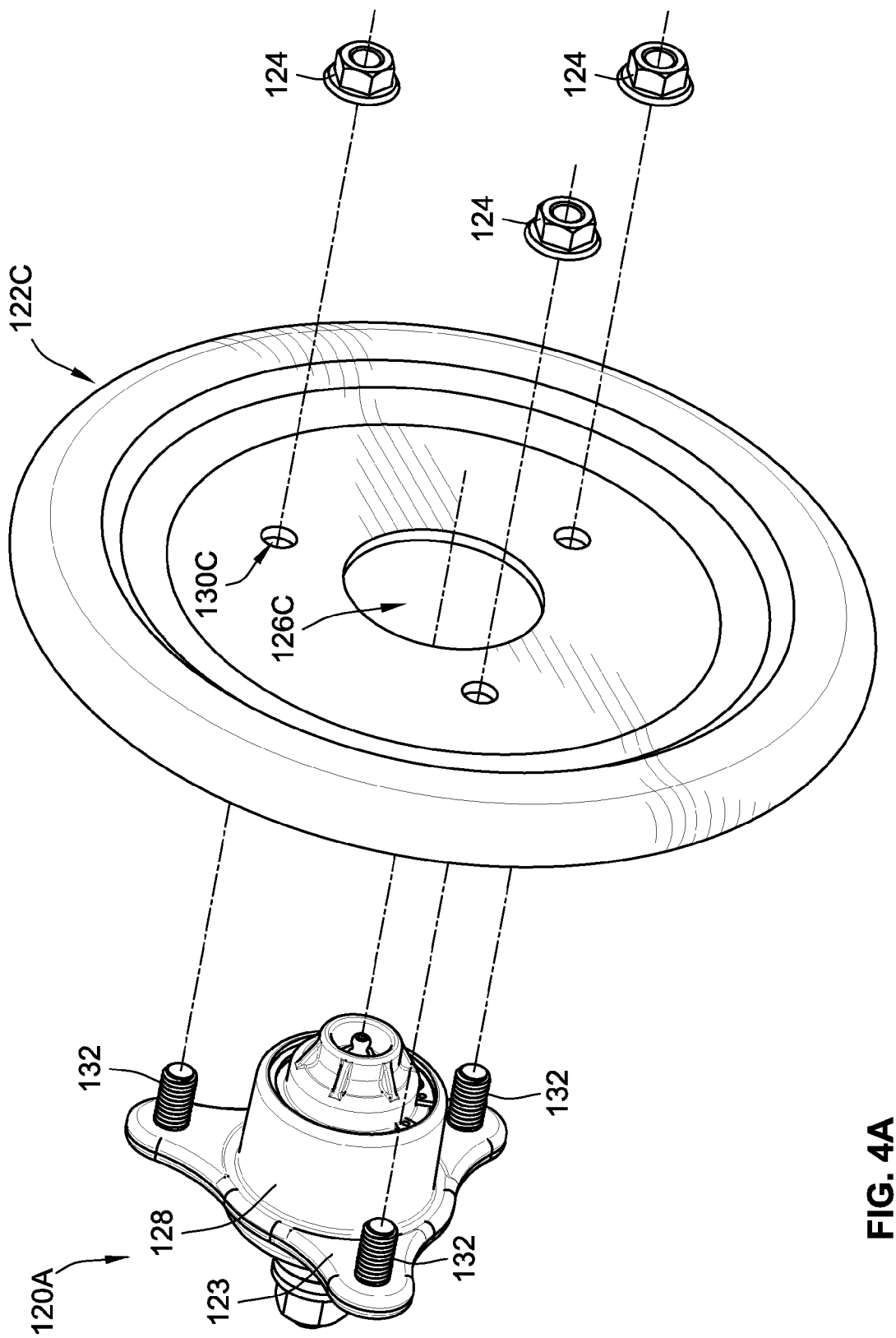
FIG. 4A is an exploded view of a closing-wheel assembly having a semi-pneumatic wheel.
Figure 4B:
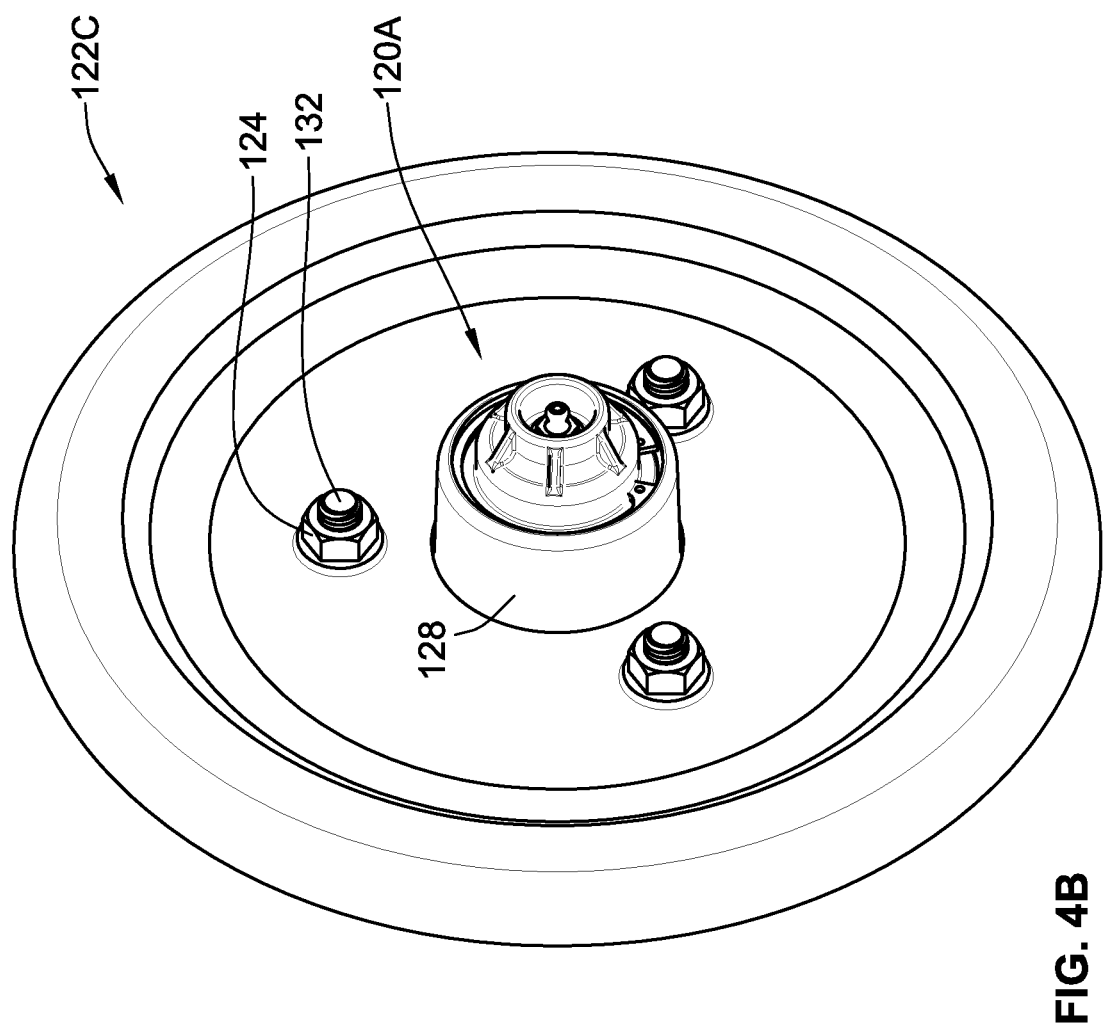
FIG. 4B is an assembled view of the closing-wheel assembly of FIG. 4A.

Referring to FIGS. 4A and 4B, the right semi-pneumatic wheel 122C has replaced the right toothed wheel 122A on the right hub assembly 120A. The right semi-pneumatic wheel 122C has a central hub hole 126C similar, if not identical, to the central hub hole 126A of the right toothed wheel 122A. The right semi-pneumatic wheel 122C also has three mounting holes 130C that are similar, if not identical, to the three mounting holes 130A of the right toothed wheel 122A.

The mounting configuration for each of the two different types of closing wheels—the toothed wheel 122A and the semi-pneumatic wheel 122C—is identical. Specifically, the mounting configuration refers to the central hub holes 126A, 126C, the mounting holes 130A, 130C, the central receiving section 128, the threaded shafts 132, and the nuts 124. In alternative examples, the mounting configuration does not have to be identical for each different type of closing wheel, but the mounting configuration must be such that the different types of closing wheel can be exchanged without requiring additional tools or components.

Figure 5:
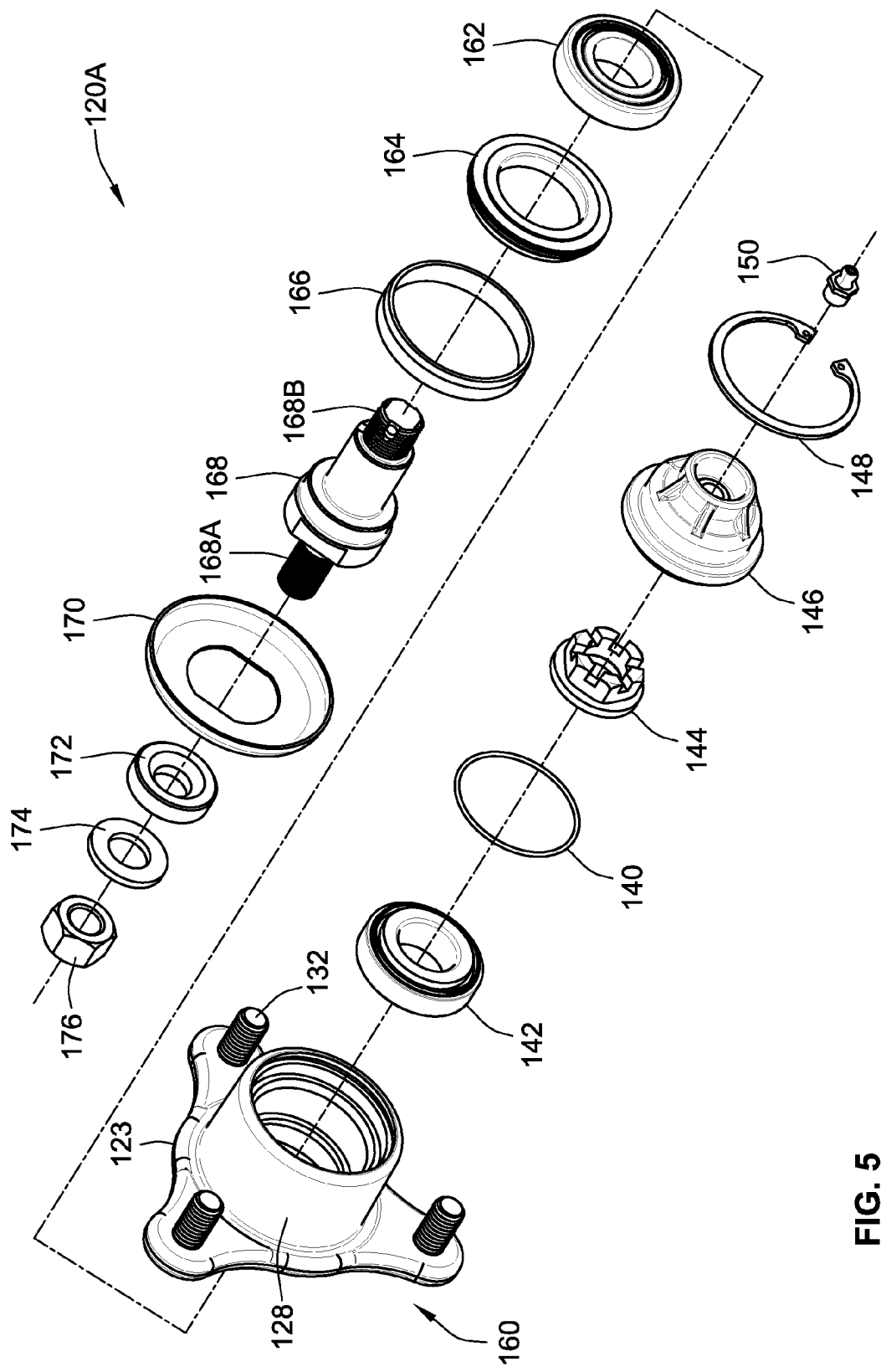
FIG. 5 is an exploded view of a hub assembly.
Figure 6:
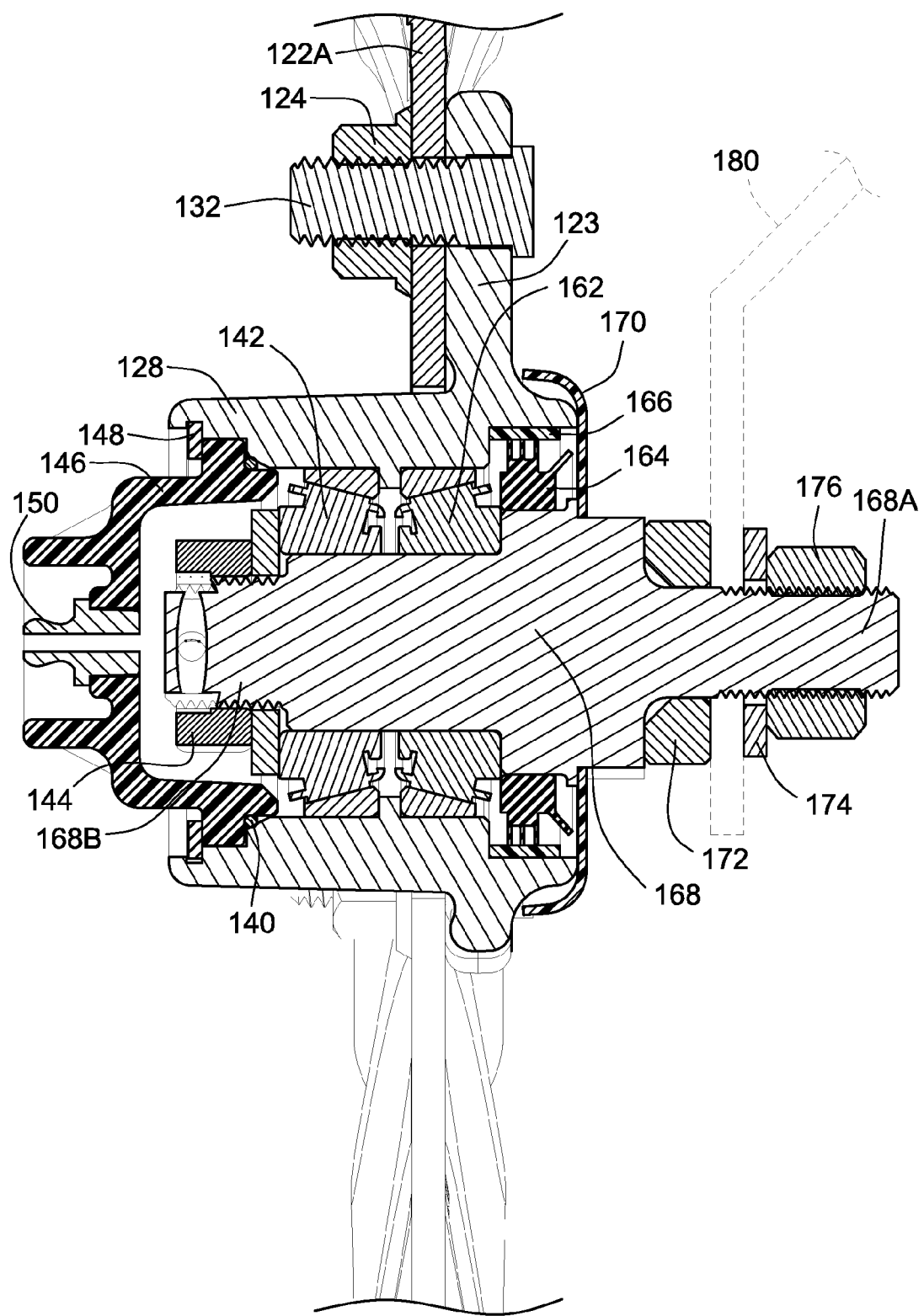
FIG. 6 is a cross-sectional view of the closing-wheel assembly of FIG. 3A.

Referring to FIGS. 5 and 6, according to an exemplary embodiment, the main hub 123 of the right hub assembly 120A has a plurality of front components that are received internally within the central receiving section 128. Specifically, the central receiving section 128 receives, sequentially, a front grease seal 140 is followed by a front bearing 142, a shaft nut 144, a grease zert protective housing 146, a housing retaining ring 148, and a grease zert 150.

The right hub assembly 120A further includes a plurality of rear components that are mounted on a rear surface 160 of the main hub 123. These components include a rear bearing 162, a rear grease seal 164, and a rear ring 166. The rear ring 166 is mounted to provide a new smooth surface against which the rear grease seal 164 can rub. Optionally, one or more of the front bearing 142 and the rear bearing 162 is a tapered roller bearing.

The rear components further include a main shaft 168 and a protective dust/grease boot 170. The protective boot 170 prevents exposure of the front bearing 142 and the rear bearing 162 to environmental contaminants when connecting the closing wheel 122A to the hub assembly 120A.

The rear components are secured to the main hub 123 via a first nut 172, which is fastened to a large threaded shaft 168A of the main shaft 168. A washer 174 and a second nut 176 are used to help secure the right hub assembly 120A to the support arm 118. For example, as shown in FIG. 6, the large threaded shaft 168A is inserted through a receiving hole of a planar surface 180 of the support arm 118. The planar surface 180 is located between the first nut 172 and the washer 174, with the second nut 176 being threaded at the end of the large threaded shaft 168A.

The main shaft 168 further includes a small threaded shaft 168B that is fastened to an internally threaded hole of the shaft nut 144 (see FIG. 6). The fastened connection between the main shaft 168 and the shaft nut 144 secures, in part, along with the housing retaining ring 148, the front components in place relative to the main hub 123.

Figure 7:
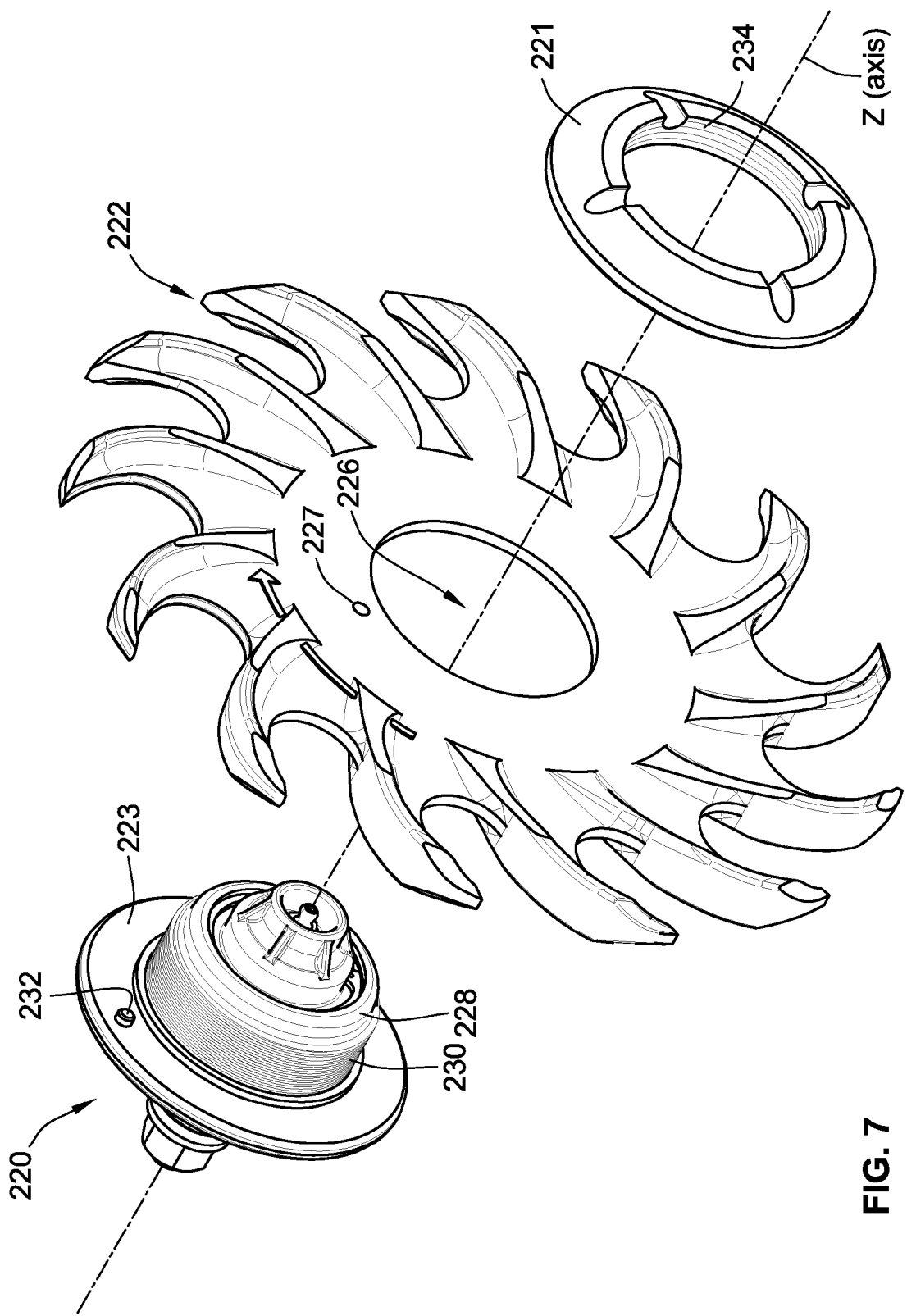
FIG. 7 is an exploded view of a closing-wheel assembly in accordance with an alternative embodiment.

Referring now to FIG. 7, a hub assembly 220 includes a single fastener in the form of a knock-off nut 221. The hub assembly 220 includes a main hub 223 having a central receiving section 228, which has an external thread 230 along its exterior periphery. The hub assembly 220 further includes an anti-rotational element 232 located along a front surface of the main hub 223. In the illustrated embodiment, the anti-rotational element 232 is in the form of a small protruding shaft extending from the front surface of the main hub 223.

A closing wheel 222 has a central hub hole 226 and an anti-rotational hole 227. To mount the closing wheel 222 to the hub assembly 220, the central hub hole 226 is inserted through the central receiving section 228. The anti-rotational hole 227 is aligned and inserted through the anti-rotational element 232. The connection between the anti-rotational hole 227 and the anti-rotational element 232 prevents rotation of the closing wheel 222 relative to a rotational axis Z of the hub assembly 220.

To secure in place the closing wheel 222 relative to the hub assembly 220, the knock-off nut 221 is fastened to the central receiving section 228, by aligning the knock-off nut 221 with the rotational axis Z and threading an internal thread 234 with the matching external thread 232 of the main hub 223. According to one example, the knock-off nut 221 has a course screw pitch. According to another example, the knock-off nut 221 has both left-handed and right-handed threads to prevent loosening of the knock-off nut during a farming operation.

To remove the closing wheel 222 from the hub assembly 220, the knock-off nut 221 is first removed, followed by the removal of the closing wheel 222. Then, a different closing wheel is positioned on the main hub 223 and secured in place with the knock-off nut 221.

Figure 8:
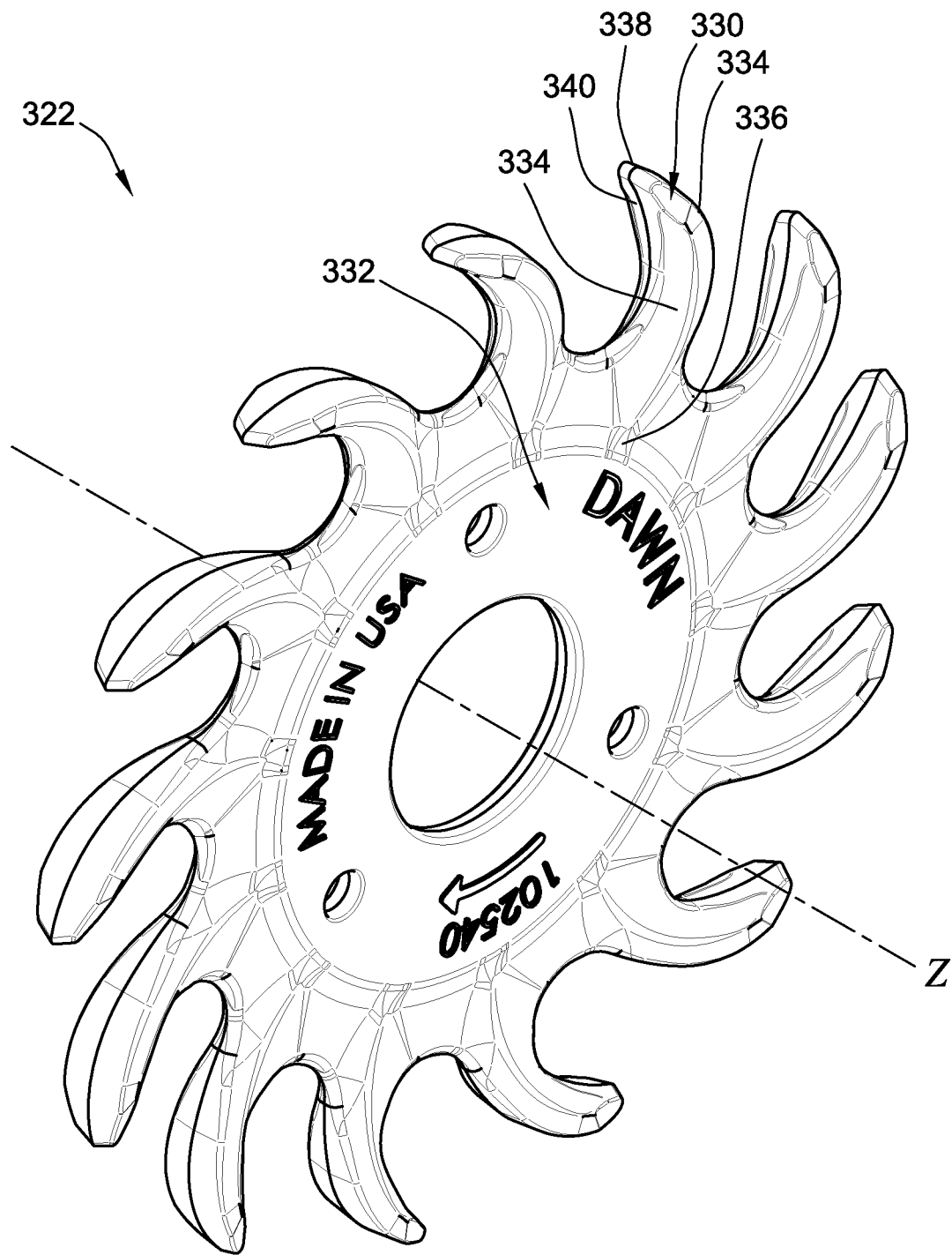
FIG. 8 is an isometric view of a toothed wheel.

Referring to FIG. 8, at least one of the closing wheel 122A, 122B, 222 described above may be a toothed wheel 322 manufactured by Dawn Equipment Company, assignee of the present application, as the Dawn Curvetine™ closing wheel. The toothed wheel 322 has a plurality of teeth 330 projecting outwardly from a hub 332. The teeth 330 and the hub 332 are formed via a forging process, which is described in more detail below, from a single piece of steel plate. The forging process provides many benefits, including making the teeth 330 resistant to shearing and, as such, less prone to severing at a root juncture with the hub 332. According to the illustrated toothed wheel 322, the plurality of teeth 330 includes 13 teeth 330. However, in other examples, the plurality of teeth 330 can include a different number of teeth. The teeth 330 are identical to each other and are spaced equidistantly around the hub 332.

Each tooth 330 has gradually transitioning surfaces 334 that extend between a tooth root 336 and a tooth end 338. The transitioning surfaces 334 are without sharp concave corners and provide a gradual, smooth, transitioning surface to prevent mud buildup between adjacent teeth 330. The tooth end 338 is beneficial at least because it helps with the manufacturability of the toothed wheel 322 and because it reduces pressure when the tooth 330 enters the soil.

Each tooth 330 has a leading surface 341 that is the widest portion of the tooth 330. The leading surface 341 is the surface that makes contact with the soil as the toothed wheel 322 rotates in a clockwise direction. Because the widest portion of the tooth 330 is also the portion that makes contact with the soil, the toothed wheel 322 operates with efficiency by using maximum wheel material to force as much soil as possible back in the open furrow. A trailing surface 340 is opposite the leading surface 341 and extends from the tooth root 336 in a curved counterclockwise manner.

Figure 9:
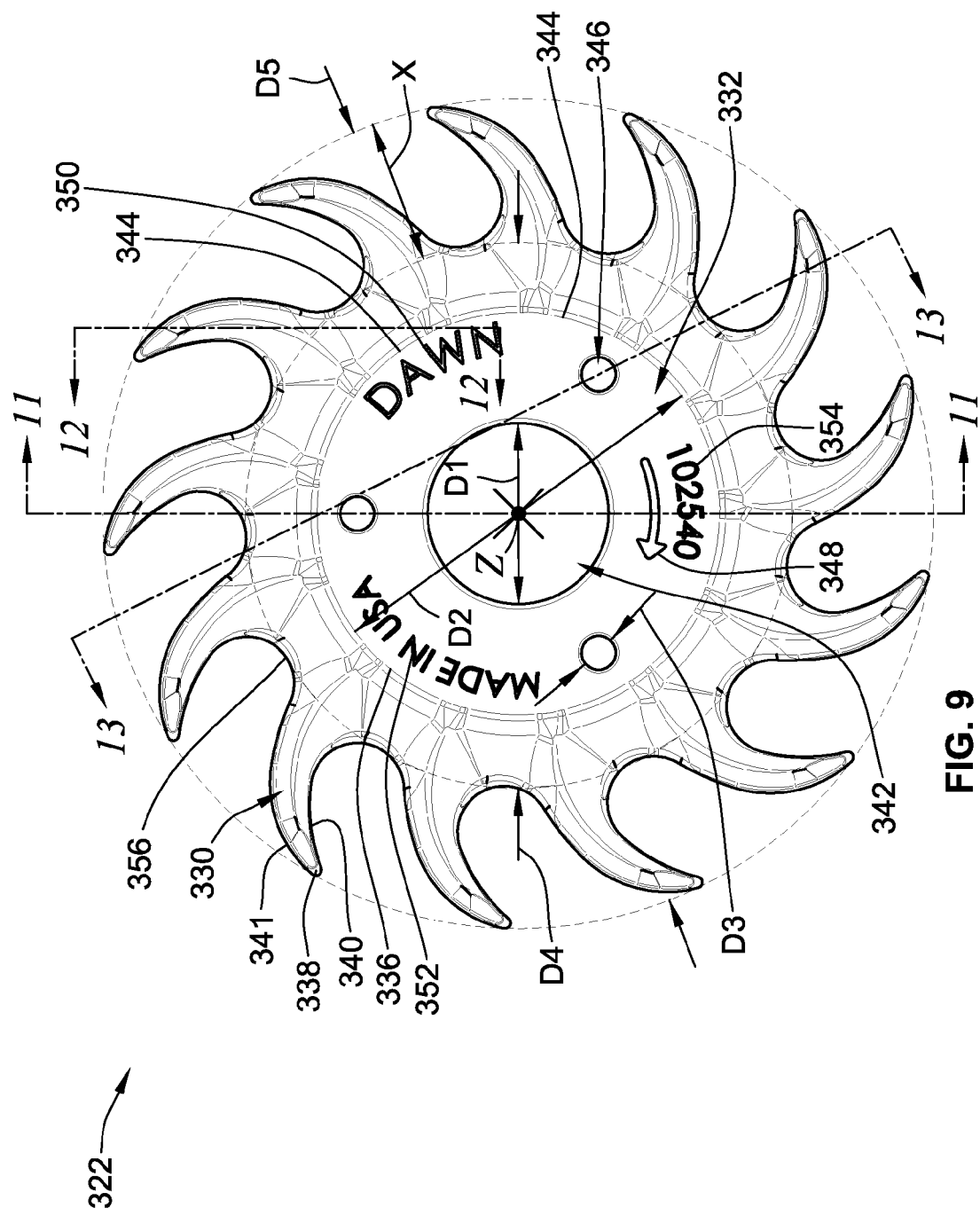
FIG. 9 is a side view of the toothed wheel of FIG. 8.

Referring to FIG. 9, the hub 332 includes a generally flat area between an internal hole 342 and an internal periphery 344. According to an example, the internal diameter D1 for the internal hole 342 is approximately 3 inches. An exemplary dimension of a diameter D2 for the internal periphery 344 of the hub 332 is approximately 6.5 inches. According to one example, the hub 332 includes three mounting holes 346 symmetrically arranged about the central axis Z of the toothed wheel 322. By way of example, each of the mounting holes 346 has a diameter D3 of approximately 0.5 inches.

The hub 332 further includes indicia on the flat area, stamped into the forged metal plate. The indicia includes, for example, an arrow 348 indicative of rotation direction, text indicative of manufacturer name 350 (e.g., "DAWN"), text indicative of the country of manufacturing 352 (e.g., "MADE IN USA"), and text indicative of a part number 354 (e.g., "102540"). The text is optionally stamped on both sides of the toothed wheel 322.

Each tooth root 336 begins at the internal periphery 344 and extends to a tooth depth diameter D4, with adjacent teeth 330 sharing an adjoining root valley 356. According to one example, the tooth depth diameter D4 is approximately 8.48 inches. From the tooth depth diameter D4, the tooth 330 extends outwards to a maximum outside diameter D5. The maximum outside diameter D5, for example, is approximately 12.91 inches. In other examples, the maximum outside diameter D5 can vary over a fairly large range provided that a tooth depth X is satisfied as discussed below.

The tooth depth X is the distance that the tooth 330 extends between the tooth depth diameter D4 and the maximum outside diameter D5. According to typical planting depth ranges, the distance X ranges between approximately 0.75 inches and approximately 3 inches, depending on a respective crop being planted. For example, a depth X of approximately 2.21 inches is beneficial because it provides a planting depth range that is applicable to many different crops.

Figure 10:
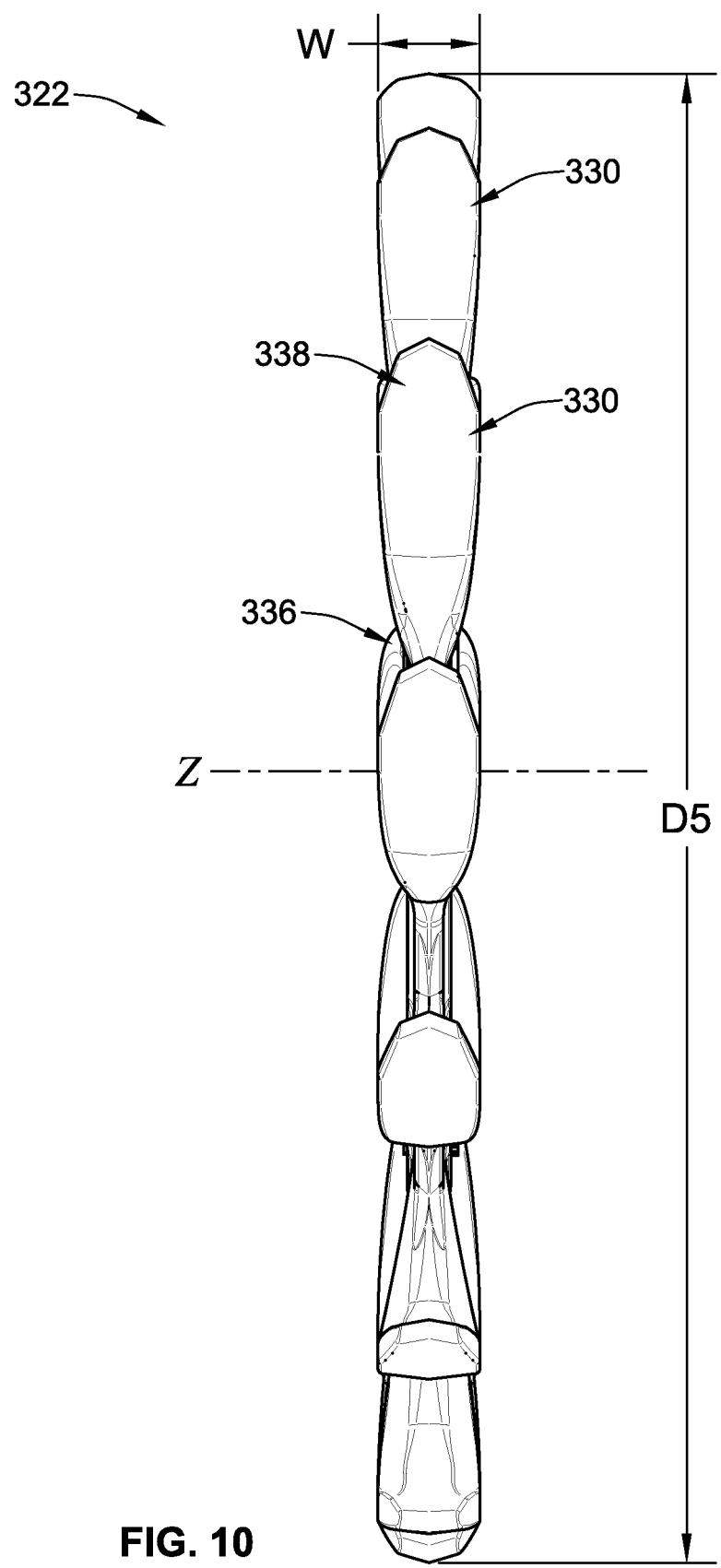
FIG. 10 is a back view of the toothed wheel of FIG. 8.
Figures 11, 12:
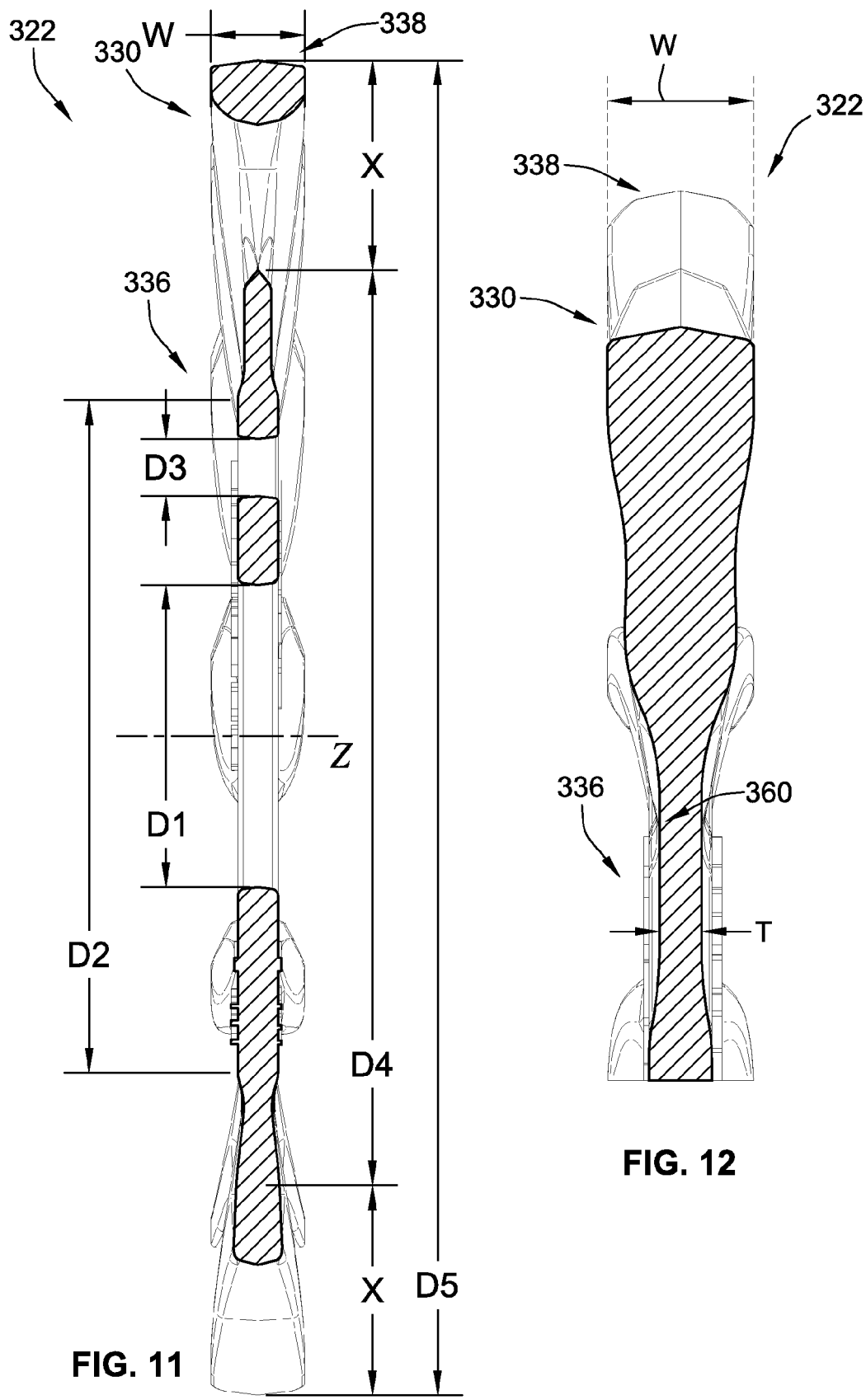
FIG. 11 is a cross-sectional view along lines "11-11" shown in FIG. 9.
FIG. 12 is a cross-sectional view along lines "12-12" shown in FIG. 9.

Referring to FIGS. 10 and 11, the respective cross-sections along lines "10-10" and "11-11" of FIG. 9 illustrate a profile of the tooth 330 in which the tooth 330 tapers with smooth continuity to a maximum tooth width W. The tapering extends in both directions—towards the tooth root 336 and towards the tooth end 338. The maximum tooth width W occurs closer to the tooth end 338 than the tooth root 336. According to one example, the maximum tooth width W has a range between approximately 0.625 inches and approximately 1.25 inches, with one preferred example being approximately 0.87 inches.

Figure 13:
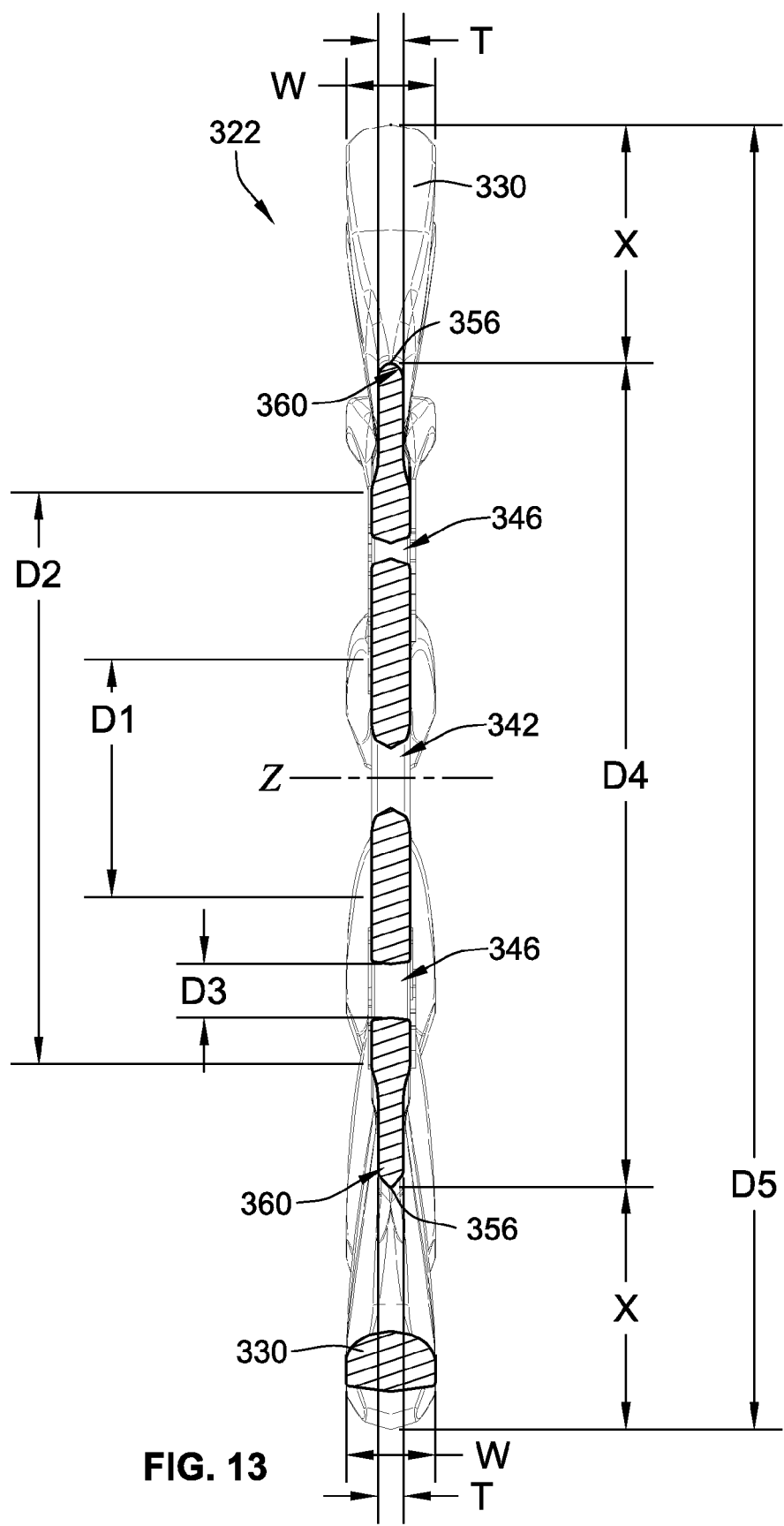
FIG. 13 is a cross-sectional view along lines "13-13" shown in FIG. 9.

Referring to FIGS. 12 and 13, the cross-sections along lines "12-12" and "13-13" of FIG. 9 illustrate a narrow area 360 between adjacent teeth 330 in which the adjacent teeth 330 are formed such that the adjoining root valley 356 comes to a point or is as narrow as possible. One benefit of the narrow area 360 is that it helps reduce mud buildup or accumulation between adjacent teeth 330. Another benefit of the narrow area 360 is that it reduces the area of contact with the soil near the root 336, which, in turn, allows movement of soil to be performed mostly by the leading surface 341 in closing the furrow.

By way of example, a thickness T in the narrow area 360 is 0.25 inches. As such, the thickness T is substantially thinner relative to the maximum tooth width W, e.g., by a factor of about 3.5 when W is 0.87 inches and T is 0.25 inches (0.87/0.25=3.48).

The toothed wheel 322 is formed via a forging process in which a normal grain pattern is changes so that it is directed substantially radially through each of the teeth 330. According to one example, the forging process is as described in more detail in U.S. Pat. No. 5,346,020, titled "Forged Clearing Wheel For Agricultural Residue," and issued on Sep. 13, 1994, which is incorporated herein in its entirety.

The forging process starts with a hot rolled bar of metal stock and ends with the toothed wheel 322 being quenched and tempered to a Rockwell hardness of 39 to 47. The hardened wheel 322 is cleaned to remove scale and vary the mechanical properties of the hardened metal to enhance the impact resistance thereof and make it more suitable for the agricultural environment in which rocks, and other hard materials might be encountered.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural closing wheel comprising:
a hub having a respective width and defining a central axis Z about which the wheel rotates in use, the hub having an outer edge defined by an internal periphery with a periphery diameter D2 and an inner edge defined by an internal circular hole with an internal diameter D1;
a plurality of teeth projecting radially outwardly from the hub to move soil into a furrow as the wheel rotates clockwise about its central axis, each tooth of the plurality of teeth having
a tooth root adjacent to the internal periphery of the hub,
a leading soil-contacting surface extending from the tooth root in a curved counterclockwise manner and having a variable width with a maximum tooth width W, the width of the hub being substantially thinner than the maximum tooth width W,
a trailing surface opposite the leading soil-contacting surface and extending from the tooth root in a curved counterclockwise manner, and
a tooth end angled counterclockwise away from a radius passing from the central axis Z through a central point of the tooth root, the tooth end converging to a point and terminating on a maximum outside diameter D5 of the wheel, the tooth end connecting the leading soil-contacting surface and the trailing surface, the tooth end trailing behind the leading soil-contacting surface relative to the clockwise wheel rotation; and
an adjoining root valley between each pair of adjacent teeth of the plurality of teeth, the root valley being along a tooth depth diameter D4 and having a thickness T that is substantially thinner than the maximum tooth width W.

2. The agricultural closing wheel of claim 1, wherein the periphery diameter D2 is approximately 6.5 inches.

3. The agricultural closing wheel of claim 1, wherein the tooth depth diameter D4 is approximately 8.48 inches.

4. The agricultural closing wheel of claim 1, wherein the maximum outside diameter D5 is approximately 12.91 inches.

5. The agricultural closing wheel of claim 1, wherein a distance between the outside diameter D5 and the tooth depth diameter D4 defines a tooth depth X, the tooth depth X having a range between approximately 0.75 inches and approximately 3 inches.

6. The agricultural closing wheel of claim 5, wherein the tooth depth X is approximately 2.21 inches.

7. The agricultural closing wheel of claim 1, wherein each tooth of the plurality of teeth has gradually transitioning surfaces for preventing soil accumulation, each tooth lacking sharp concave corners.

8. The agricultural closing wheel of claim 1, wherein the thickness T is thinner than the maximum tooth width W by a factor of approximately 3.5.

9. The agricultural closing wheel of claim 8, wherein the thickness T is approximately 0.25 inches and the maximum tooth width W is approximately 0.87 inches.

10. The agricultural closing wheel of claim 1, wherein the plurality of teeth includes 13 teeth.

11. The agricultural closing wheel of claim 1, wherein the wheel is forged.

12. The agricultural closing wheel of claim 11, wherein the forged wheel has a radial grain pattern through each of the plurality of teeth.

\* \* \* \* \*